United States Patent
McCauley et al.

(10) Patent No.: US 6,434,578 B1
(45) Date of Patent: *Aug. 13, 2002

(54) GENERATING INSTRUCTION SEQUENCES USING INDEPENDENTLY EXECUTABLE PANE RENDERERS

(75) Inventors: David McCauley; Bassam Tabbara, both of Seattle; John Rinaldo, Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/669,781

(22) Filed: Jun. 26, 1996

(51) Int. Cl.[7] ............................................... G06F 17/21
(52) U.S. Cl. .................... 707/517; 707/501.1; 707/513; 707/523
(58) Field of Search ................................. 707/501, 513, 707/514, 517, 520, 521; 345/339, 340, 342, 346

(56) References Cited

U.S. PATENT DOCUMENTS

| | | | | |
|---|---|---|---|---|
| 5,644,776 A | * | 7/1997 | DeRose et al. ............. | 707/500 |
| 5,680,152 A | * | 10/1997 | Bricklin ....................... | 345/119 |
| 5,760,772 A | * | 6/1998 | Austin ......................... | 345/342 |
| 5,764,235 A | * | 6/1998 | Hunt et al. .................. | 345/428 |
| 5,793,972 A | * | 8/1998 | Shane .................... | 395/200.49 |
| 5,812,847 A | * | 9/1998 | Joshi et al. ................. | 395/682 |
| 5,844,559 A | * | 12/1998 | Guha .......................... | 345/348 |
| 5,860,073 A | * | 1/1999 | Ferrel et al. ................ | 707/522 |
| 5,894,554 A | * | 4/1999 | Lowery et al. ........ | 395/200.33 |
| 6,006,242 A | * | 12/1999 | Poole et al. ................ | 707/531 |
| 6,014,638 A | * | 1/2000 | Burge et al. ................... | 705/27 |

OTHER PUBLICATIONS

Oliver et al., *Netscape 2 Unleashed,* Sams.net Publishing, Feb. 1996, pp. 408–413 and 422–437.*

* cited by examiner

Primary Examiner—Stephen S. Hong
(74) Attorney, Agent, or Firm—Lee & Hayes, PLLC

(57) ABSTRACT

An information server system is responsive to page specifications to render information pages at a plurality of clients that use different client software and that have widely different characteristics. Information pages are authored in a generic page specification format that is not limited to any particular client or client software. In response to a request for the information page, the server system selects and executes a page renderer that is compatible with the client software of the client requesting the information. The page renderer converts the page specification of the information page to an instruction sequence that is tailored particularly for the requesting client. The conversion is accomplished by selecting and executing a plurality of independently-executable pane renderers.

20 Claims, 7 Drawing Sheets

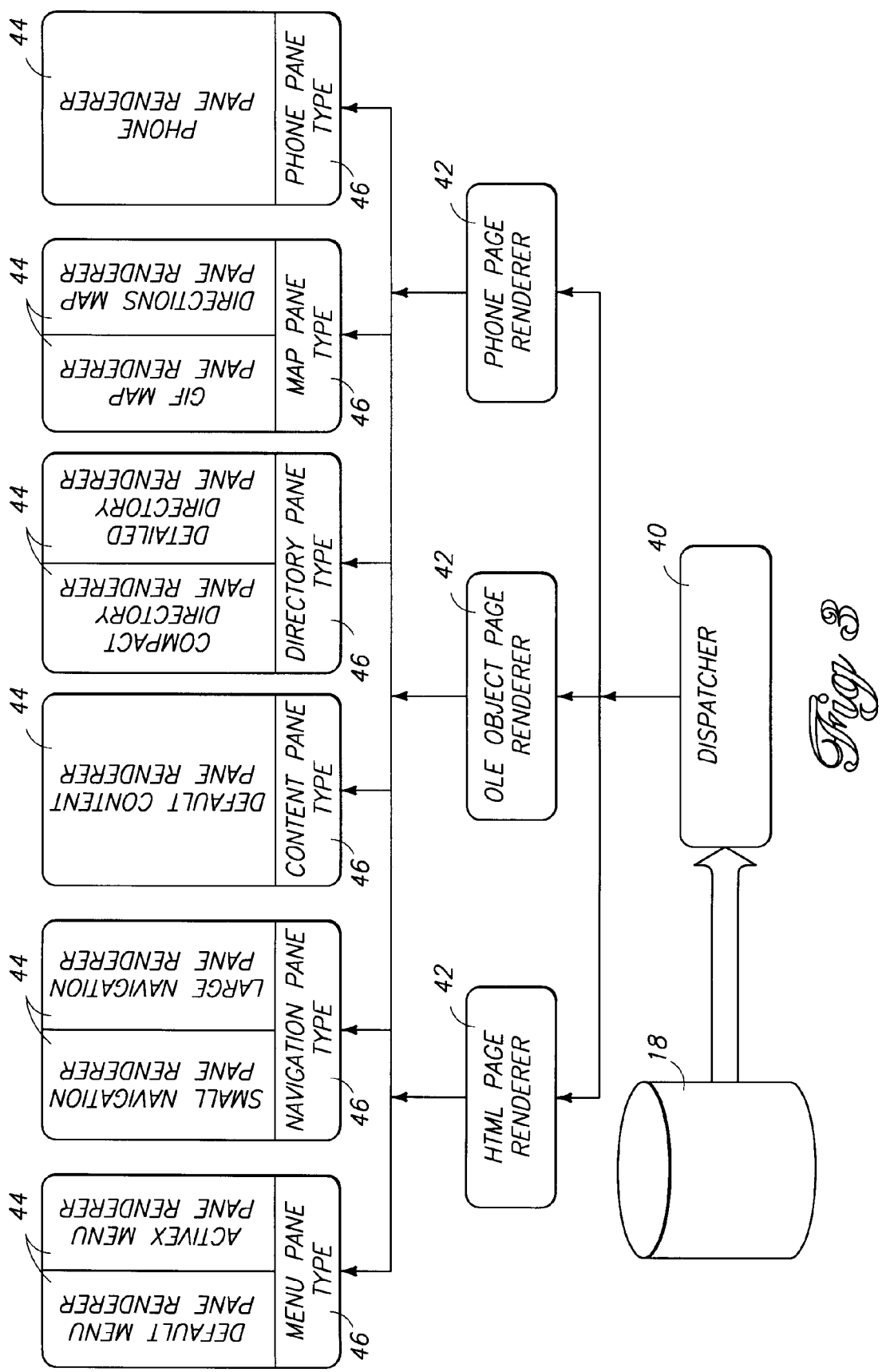

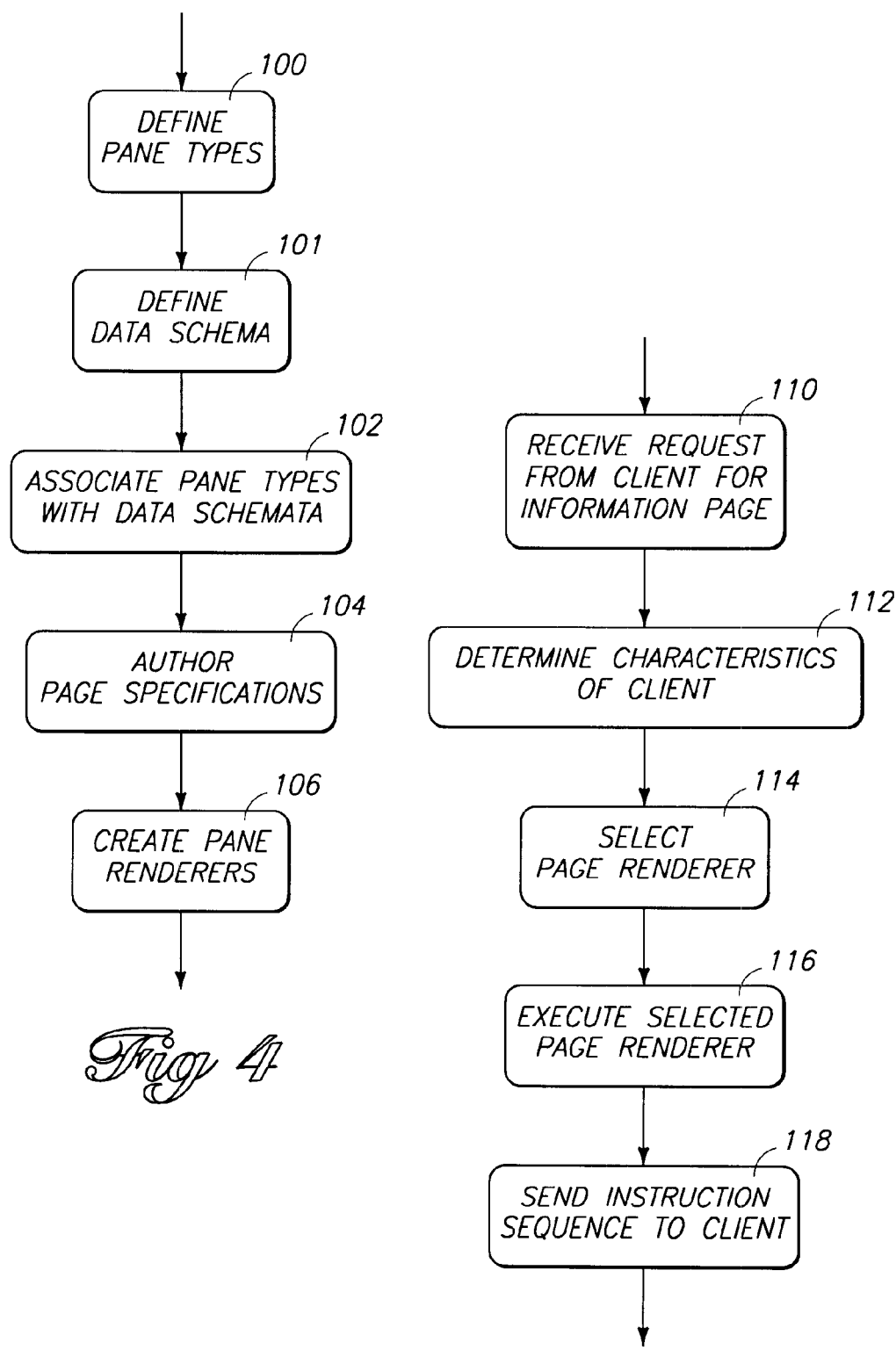

| PAGE ID = 100 ||
|---|---|
| TITLE PANE ID = 1 | (EMPTY) |
| MENU PANE ID = 2 | (EMPTY) |
| (EMPTY) | (EMPTY) |

| PANE ID | PANE TYPE | % OF WIDTH | % OF HEIGHT | DATA SOURCE |
|---------|-----------|------------|-------------|-------------|
| 1 | TITLE | 100 | 25 | SP_TITLE |
| 2 | MENU | 100 | 75 | SP_MENU |

*Fig. 9*

| TITLE ID | TITLE | IMAGE |
|----------|-------|-------|
| 1 | CITYSCAPE | CITYLOGO.GIF |

*Fig. 10*

| MENU ITEM ID | MENU ITEM NAME |
|--------------|----------------|
| 0 | CITYSCAPE PRESENTS |
| 1 | ARTS & ENTERTAINMENT |
| 2 | SEATTLE RESTAURANTS |
| 3 | SPORTS |
| 4 | AROUND TOWN |
| 5 | BUSINESS PAGES |
| 6 | SEATTLE CITY MAP |

*Fig. 11*

Cityscape

CITYSCAPE PRESENTS
ARTS & ENTERTAINMENT
SEATTLE RESTAURANTS
SPORTS
AROUND TOWN
BUSINESS PAGES
SEATTLE CITY MAP

CITYSCAPE PRESENTS
ARTS & ENTERTAINMENT
SEATTLE RESTAURANTS
SPORTS
AROUND TOWN
BUSINESS PAGES
SEATTLE CITY MAP

GENERATING INSTRUCTION SEQUENCES USING INDEPENDENTLY EXECUTABLE PANE RENDERERS

TECHNICAL FIELD

This invention relates to methods and systems for authoring and rendering hypermedia content in conjunction with client devices such as Internet browsers.

BACKGROUND OF THE INVENTION

"Hypermedia" is a metaphor for presenting information in which text, images, sounds, and actions become linked together in a complex, non-sequential web of associations that permit a user to browse through related topics, regardless of the presented order of the topics. "Hypermedia" arises from the term "hypertext," which was originally coined to describe linking in textual documents.

Hypermedia content is widely used for navigation and information dissemination on the "World-Wide Web" (WWW or Web) of the Internet. An application program referred to as a client viewer or "Web browser" is normally used to retrieve and render hypermedia content from the WWW.

Hypermedia content is commonly organized as documents or files with embedded control information. The embedded control information includes formatting specifications, indicating how a document is to be rendered by the Web browser. In addition, such control information can include links or "hyperlinks": symbols or instructions telling the Web browser where to find other related WWW documents on the Internet. A hyperlink from one hypermedia topic to another is normally established by the author of a hypermedia document, although some applications allow users to insert hyperlinks to desired topics.

When a user selects or activates a hyperlink from a browser, the browser requests the document or file that is targeted by the hyperlink. In response, the file is downloaded to the browser, and the browser displays or otherwise renders the hypermedia content specified by the file.

WWW technology has progressed at a very high rate, accompanied by intense competition between various companies hoping for their own products to become accepted standards. Web browsers have been a particular subject of competition, with different companies adding different useful innovations to their browsers.

The different functionality of available browsers presents a dilemma for authors of WWW content. To assure compatibility across a wide range of browsers, authors can simply limit their use of features to a core set that is available on all or nearly all browsers. Much more impressive presentations can of course be achieved by utilizing more advanced features; at the unfortunate cost, however, of limiting available audiences to those having browsers with the advanced features.

In some cases, it is possible to format a WWW document for a particular browser, and the document will still be viewable with other browsers. However, the other browsers will not be able to display the document with all of its formatting, and the document will not look as good on these browsers.

A similar problem is presented by the distribution of WWW content to users or clients having vastly different equipment characteristics or capabilities. Communications speed is one characteristic that varies widely between Internet users. Many users are limited to relatively slow speeds such as 9600 bits-per-second. At this speed, transferring bit-mapped graphic images is painfully slow. Other users might have a connection to an Internet provider at 28,800 bits-per-second, making bit-mapped image transfer much more acceptable. Still other users might have connections at ISDN or higher speeds, allowing the exchange of data at much higher resolutions.

Displays also vary dramatically from client to client. It is becoming more and more common for desk-based computers to have 21-inch, high-resolution, color displays. At the same time, the use of laptop computers is becoming very common. Laptop computers typically have more limited display capabilities. Other devices might have even more limited capabilities. Electronic pocket organizers, for instance, might have only a very small monochrome display, at a very low pixel resolution.

It is difficult, and in many cases impossible, for an author to create a WWW document that is well suited for all of the different clients that might eventually make use of the document. Presently, the only way to achieve this goal is to create multiple hypertext documents, or possibly to vary document contents by using embedded scripts. For clients having small displays and low communication speeds, the author might wish to limit the amount of graphic images provided, or in some cases to provide images in monochrome rather than color format. For clients having large displays, communicating at ISDN speeds, it will be more desirable to provide extensive color, high-resolution graphics. The author might also wish to create different WWW documents for clients using different browsers. One can imagine many other variations that an author might wish to make in WWW documents based on different characteristics of intended clients or users.

We believe that there is a more efficient way to make varied presentations to users having different characteristics—one that requires very little additional effort on the part of multimedia authors.

SUMMARY OF THE INVENTION

The invention involves authoring multimedia content in a generic format that is not specific to the features of any particular client browser. When a client requests an information page, a server reads a page specification and converts it into a format that is tailored specifically for the requesting client. The information page is converted into a format that utilizes advanced features of the client's browser and that also efficiently utilizes the resources available to the client.

To render a requested information page at a client device, the server selects a page renderer that is compatible with the client's rendering software. The page renderer then selects different pane renderers which are responsible for different portions of the overall information page. The pane renderers have different ways of rendering the same information, and the page renderer selects the pane renderers to result in a desired format that efficiently utilizes the client's resources. The page renderer lays out or arranges the portions or panes of the information page, and then calls the selected pane renderers to emit instructions for rendering the individual panes.

The page specification for a particular page indicates nominal sizes and positions of the individual panes within the page. However, the page renderer is free to vary these parameters as necessary to achieve a useful rendering for each individual client.

BRIEF DESCRIPTION OF THE DRAWINGS

FIG. 3 is a block diagram showing components of a server application program in accordance with the preferred embodiment of the invention.

FIG. 4 is flow chart showing preparatory steps performed in accordance with the invention.

FIG. 5 is a flow chart showing steps performed by a dispatcher in accordance with the invention.

FIG. 9 shows pane specifications of the exemplary information page.

FIGS. 10 and 11 show pane data for the exemplary information page.

DETAILED DESCRIPTION OF THE PREFERRED EMBODIMENT

As a preliminary matter, the following disclosure assumes a familiarity with Internet and WWW practices, formats, and protocols. A great number of books are available on these subjects. Stout, Rick, *The World Wide Web: Complete Reference,* McGraw-Hill, 1996, is one example which is hereby incorporated by reference.

Figure 1:
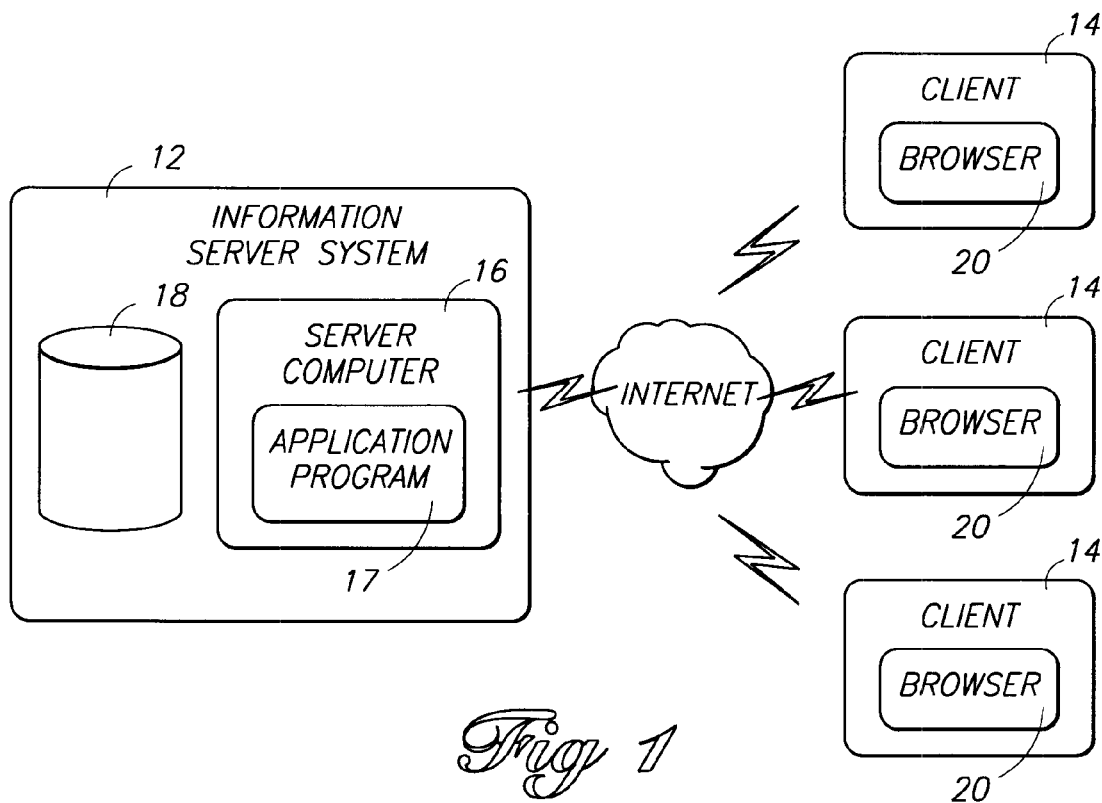
FIG. 1 is a block diagram of an information server system in accordance with a preferred embodiment of the invention.

FIG. 1 shows an information server system 12 in accordance with the invention, connected for data communications with associated clients or client devices 14. The information server system comprises a server 16 and a repository 18 of published hypertext content. Server 16 is a computer that executes a server application program 17. The components of server application program 17 will be described more fully below. Server 16 has access to repository 18, which is typically a hard disk or other mass storage device. Mass storage device 18 can be located either locally or remotely, and can be connected through a local bus, a local-area network, or a wide-area network such as the Internet. Server 16 includes a data processor, electronic memory, and other components common to computers that are used for server applications.

Each of client devices 14 is any device such as a personal computer that might be connected to receive information from server system 12. Client device 14 has a client viewer 20 that forms an interface to a human user or operator. Client viewer 20 interprets instruction and data streams provided by system 12 and in response presents information to the user in textual, graphical, or other forms. Client viewer 20 also accepts operator input, and allows the operator to select and navigate from one hypermedia document to another using hyperlinks as described above. Client viewer 20 is connected for data communications with server system 12 by a suitable communications medium such as a local or wide area network, by a modem link, or by a similar continuous or on-demand connection. The preferred data connection between server system 12 and client devices 14 is through the Internet, using HTTP (hypertext transport protocol).

In the preferred embodiment, client viewer 20 is a conventional, off-the-shelf Internet Web browser, having features and functions such as are common to popular Web browsers. Client viewer 20 is not limited to any particular type of Web browser. For instance, client viewer 20 might be the Internet Explorer, available from Microsoft Corporation of Redmond, Wash., or a Netscape Navigator browser, available from Netscape of Mountain View, Calif. Each of these browsers supports a different feature set, and responds to different commands and command sets. In addition, the term "client viewer" as used herein encompasses any software that is used by a client to interpret data obtained from server system 12. In the future, such software will likely comprise a variety of downloadable components and helper applications used by software other than traditional browsers to render multimedia content from the Internet or other servers.

Clients 14 potentially have widely different characteristics. As already described, each might run a different browser or client viewer, and each such browser or client viewer might support a different set of commands and features. Furthermore, the clients might have different communications capabilities—one might be connected to the Internet and server system 12 through a high-speed ISDN connection while another is connected through a 9600 bits-per-second modem. Display characteristics of the clients might also vary, ranging from very small, low-resolution, monochrome displays to large, high-resolution color displays.

Server system 12 is responsive to page specifications authored independently, by different authors, to render information pages at a plurality of clients that use different client viewers. An information page is an arbitrary unit of information content that is typically provided to a client as a unit. Each page specification indicates page content and an associated page design for an information page.

The content of an information page typically includes text, data, hyperlinks, and graphic images, and might also include sound clips, video clips, or other types of information. The page design specifies the format or approximate layout of the page as the author intends it to be viewed by a user. In the preferred embodiment of the invention, the page specifications are written generically, and are not limited to the commands or features of any particular client viewer, or to the characteristics of any particular client device. Furthermore, the page specifications set forth only "suggestions" as to the ultimate layout of pages. The actual layout is determined on a client-by-client basis, depending on the characteristics of the client. Server application program 17 converts the page specification to a layout that is optimized for each requesting client, using commands and features that are supported by the requesting client, but which may not be supported by all other clients or client viewers.

Figure 2:
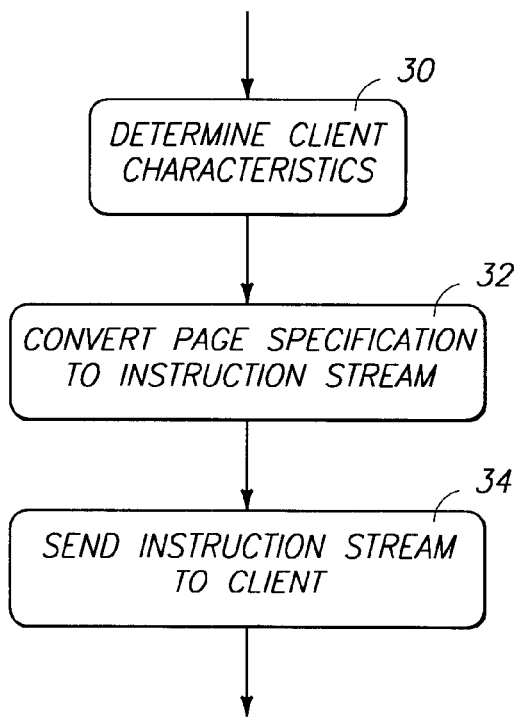
FIG. 2 is a flow chart showing general steps performed in accordance with the invention.

FIG. 2 illustrates general methodical steps performed by server system 12, or more specifically by server application program 17. Server program 17 implements a method of rendering information pages based on page specifications. The rendering is accomplished by emitting or formulating an instruction sequence and sending it to a client device. The instruction sequence is interpreted by the client viewer running on client device 14 to render the information page.

The steps of FIG. 2 are performed in response to receiving a request for an information page by a particular client using a particular client viewer. The request is performed in accordance with HTTP, by supplying a URL (uniform resource locator) to server system 12 along with the associated "Headers" information in accordance with the HTTP protocol.

A first step 30 comprises determining characteristics of the client, including such things as which viewer or browser the client is using, display characteristics of the client device, and communication characteristics associated with the connection to the client device. This step might be accomplished by examining data routinely sent with HTTP requests or by using known information about a particular type of browser. Alternatively, server system 12 might query the user by using the user input capabilities of the browser. Another way to determine the characteristics of the client device would be to maintain a database listing capabilities of various client devices, and to refer to this database in response to requests for information pages.

A subsequent step 32 comprises converting the page specification corresponding to the requested information page to an actual instruction stream that is optimized for the requesting client. More specifically, server system 12 converts the page specification, including the page design and indicated page content, to an instruction stream utilizing commands and features that are specific to the client viewer. In addition, server system 12 tailors the instruction stream to render the information page in a format that most efficiently utilizes the characteristics of the client device. For instance, server system 12 might utilize one font size for information page text when the client device has a small display screen, and use another font size for other devices. Similarly, graphics might be provided in color for those clients that can make use of color, and in monochrome for other clients. The resolution of graphics images might be varied depending on the communications capabilities of the requesting client.

The instruction stream will often utilize commands and offered features of the requesting client viewer, even though the commands and features are not offered by different client viewers. For example, the instruction stream might utilize HTML (hypertext markup language) table features. HTML table features are available on some browsers, but not others. When providing the information to a different client, the instruction stream might utilize HTML frame features. Still another example is an instruction stream that utilizes ActiveX controls (formerly referred to as OLE—object linking and embedding) in a client browser, such as a stream that instructs the client to open ActiveX controls or objects at the client. Further examples are available, and many more will arise in the future. The instruction stream might utilize many different capabilities unique to particular types of clients, such as sound, video, animation, recording capabilities, and realtime transmission of these different types of media.

A telephone is a more unusual example of a client device. In this case, the instruction stream might be configured to present information in the form of spoken or synthesized words. Furthermore, the instruction stream might generate phone-specific audio, such as "press 2 for Restaurants," and utilize features such as LCD displays that are present in some types of digital phones.

A final step 34 comprises providing or sending the instruction stream to the client to render the information page in conjunction with the client viewer, using the commands and features of the client viewer. The instruction stream is preferably transmitted using HTTP in accordance with accepted standards.

FIG. 3 shows elements of server application program 17 that are used to render information pages in accordance with the specific characteristics of clients. These elements include a dispatcher 40 and a plurality of page renderers 42. Each page renderer is an independently-executable program module or object. The page renderers are configured respectively to render information pages in conjunction with different client viewers. For example, the page renderers include an HTML page renderer, an ActiveX page renderer, and a telephone page renderer. The HTML page renderer is configured to emit HTML instructions for interpretation by an HTML browser. The ActiveX page renderer emits instructions that are understood by a browser configured to activate ActiveX controls in response to hypertext documents. The telephone page renderer emits instructions that implement a user interface through a telephone.

Dispatcher 40 is the supervisory part of server application program 17. In response to a request for an information page, the dispatcher selects and initiates an appropriate page renderer based on which client viewer the requesting client is using.

The various available page renderers are configured to tailor renderings of the information pages specifically for the individual requesting clients, in response to characteristics of the clients such as display and communication characteristics. For example, an HTML page renderer decides whether to use frames or tables based on the browser capabilities of the client. As another example, the HTML page renderer controls the visual formatting and layout of page renderings on client computers through its selection of pane renderers, as will be more fully described below. The page renderer, in conjunction with the selected pane renderers, emits instructions for individual clients in accordance with the tailored renderings of the information pages.

Every page renderer reads and uses a page specification to decide how to render an information page. An individual information page has only a single page specification, which is used by any page renderer attempting to render the information page. Each page specification includes pane specifications for individual panes within the information page. A pane, as used herein, is an individual portion, area, or sub-division of an information page. A page is made up of one or more panes, and all page information is presented within one of such panes. In the present embodiment of the invention, panes are tiled or otherwise arranged in mutually exclusive areas of the display screen. However, panes might alternatively be allowed to overlap each other similarly to windows in popular graphical user interfaces.

An individual pane specification includes the following elements: (a) pane ID, (b) pane order number, (c) pane type, (d) nominal percentage of width, and (e) nominal percentage of height. The pane ID is an arbitrary numeric identifier used to reference the pane from within other parts of a page specification. The pane order number indicates the relative position of the pane in a 3×2 grid. The pane type indicates one of a plurality of pane type definitions upon which the pane is based. The nominal percentage of width parameter indicates the approximate percentage of overall page width that is to be occupied by the pane. The nominal percentage of height parameter indicates the approximate percentage of overall page height that is to be occupied by the pane.

In addition to the pane specifications, which indicate nominal or relative pane sizes (through the nominal percentage of width and nominal percentage of height parameters), a page specification also indicates nominal positions of the panes relative to each other. In the preferred embodiment, a page is divided into a matrix of six possible panes: two panes wide and three panes high. The page specification includes an assignment of each pane (by referring to its pane ID) to one of the six possible panes.

Instructions for rendering pane content of a single page are emitted by a plurality of pane renderers 44. Pane renderers 44 are independently-authored and independently-executable program modules or objects that emit pane instruction sequences in response to pane specifications. Each such pane instruction sequence renders at least a portion of an information page when it is sent to and interpreted by a client viewer. More specifically, each pane renderer renders a respective individual pane in a particular format in conjunction with a particular client viewer. In the preferred embodiment, the pane renderers are implemented as COM (component object model) objects. Refer to Brockschmitt, Kraig, *Inside OLE, Second Edition,* Microsoft Press, 1995, hereby incorporated by reference, for a detailed discussion of COM objects.

Each pane renderer is associated with one of a plurality of pane types 46. As examples, FIG. 3 shows a menu pane type, a navigation pane type, a content pane type, a directory pane type, and a map pane type. A menu pane type might define a pane that enumerates menu selections. A navigation pane type could define a pane that enumerates a number of hypermedia targets. A content pane type might define a pane that simply displays textual information. A directory pane type could define a pane that displays file directories and their associated files. A map pane type might define a pane that displays geographical information such as a two-dimensional map.

Each pane type is associated with a data schema characterizing data or information content to be rendered by the pane renderer. The data schema defines two types of content or characteristics of a pane: pane instance information relating to an instance of a pane in general, and pane enumeration information relating to multiple data records that might be enumerated within a pane instance. The data schema does not provide the actual pane content; it only defines the type of data that must be provided to the pane renderer.

As an example, consider a "menu" pane type. This type of pane displays a linear listing or enumeration of menu choices. The menu pane type is defined by specifying that each instance of the pane will need an indication of the font color to be used within the pane and of a background graphic image. Pane instance information might also include a paragraph of introductory text. Similarly, the definition of the menu pane type specifies that each item that is to be enumerated within the menu must be specified by indicating a menu item name and an associated hyperlink target.

Some pane types might include only instance information and no enumerated data where there is no desire to present any specific listing of data records. For example, the "content" pane type might use only instance data such as HTML-formatted text, where text alone is to be presented.

Also associated with each pane type is an indication of the meaning of information that is to be conveyed to the user, to be used as a guide for the authors of pane renderers in laying out content within a pane.

Finally, each pane type is associated with a set of pane type rules for choosing between available pane renderers. A plurality of pane renderers are provided for each pane type. Each of these renderers utilizes the same data and data schema, but supplies the data to the requesting client in a different way. One pane renderer might implement a pane as an HTML table, while another might implement the same pane as an ActiveX object. Similarly, one pane renderer might provide detailed color graphic images to a client, while another pane renderer provides only thumbnail monochrome images.

The active page renderer uses the pane type rules to select individual pane renderers from the plurality of available pane renderers, to tailor the renderings of the information pages in light of client characteristics. If the page renderer determines that a particular client can make use of HTML tables, the page renderer selects pane renderers that provide HTML tables. If the page renderer determines that a client can efficiently utilize high-resolution graphic images, the page renderer selects pane renderers that provide such images. The page renderer has general responsibility for determining the optimal layout of the page, and for initiating the pane renderers at appropriate times for emitting pane instruction sequences in the desired format. Note that in some cases, pane renderers themselves might make layout decisions based on client characteristics.

FIG. 4 shows preliminary steps performed in accordance with a preferred embodiment of the invention. A first step 100 comprises defining a plurality of graphical pane types. Examples of pane types that might be defined include title pane types, menu pane types, content pane types, navigation pane types, directory pane types, and map pane types. A subsequent step 101 comprises defining data schemata characterizing data to be rendered by the pane renderers. Associated step 102 comprises associating each pane type with a data schema.

A step 104 comprises authoring page specifications indicating page content and associated page designs for information pages. Within a page specification, a page is defined in terms of graphical panes of the different pane types. The page specification includes an identification of data, in accordance with the data schema of the pane type, that is to be rendered in the panes of the information page. As one alternative, the page specification might include a resolved reference to an information table or database structure that is external to the page specification. As another alternative, the page specification might indicate a query or the location of a query that is to be run against a database to obtain instance data and/or enumerated data for an information pane in accordance with the associated data schema.

A further step 106 comprises creating or otherwise providing a plurality of independently-executable pane renderers corresponding to each pane type. The different pane renderers are executable by server 16 to emit pane instruction sequences in response to pane specifications, wherein the pane instruction sequences are optimized for certain client characteristics. As already described, one pane renderer might produce an instruction sequence that takes advantage of a large, high-resolution display, while another pane renderer might make the most efficient use of low communication speeds to the client. The pane renderers might also take advantage of different capabilities of browsers or other client software. For each pane type, there is a potentially unlimited number of pane renderers.

FIG. 5 shows steps performed by dispatcher 40 of server application program 17. Step 110 comprises receiving a request from a client for a particular information page. The remaining steps are performed in response to this request.

Step 112 comprises determining characteristics of the client that has requested the information page. Specifically, the dispatcher needs to know which browser or viewing software the client is using. In addition, the dispatcher may determine other pertinent characteristics of the client, such as display and communications capabilities, which will be subsequently used in rendering the information page.

Step 114 comprises selecting a page renderer from the plurality of available page renderers. The page renderer is selected largely based on which client viewer the client is using. For example, if the client uses an HTML viewer, the dispatcher selects an HTML page renderer. The purpose of each page renderer is to convert the page specification of the requested information page to an instruction stream or sequence that is tailored to the characteristics of the requesting client device. In many cases, the page renderer will use commands and features that are not offered by client viewers other than the client viewer the client is using.

A page renderer might also be chosen on other bases, such as on the basis of which operating system the client is using, or upon the communications capabilities of the client.

Step 116 comprises executing the selected page renderer. This step results in an instruction sequence that is tailored especially for the requesting client device. Step 118 comprises sending the instruction sequence to the client and the client viewer, which in response render the information page.

Figure 6:
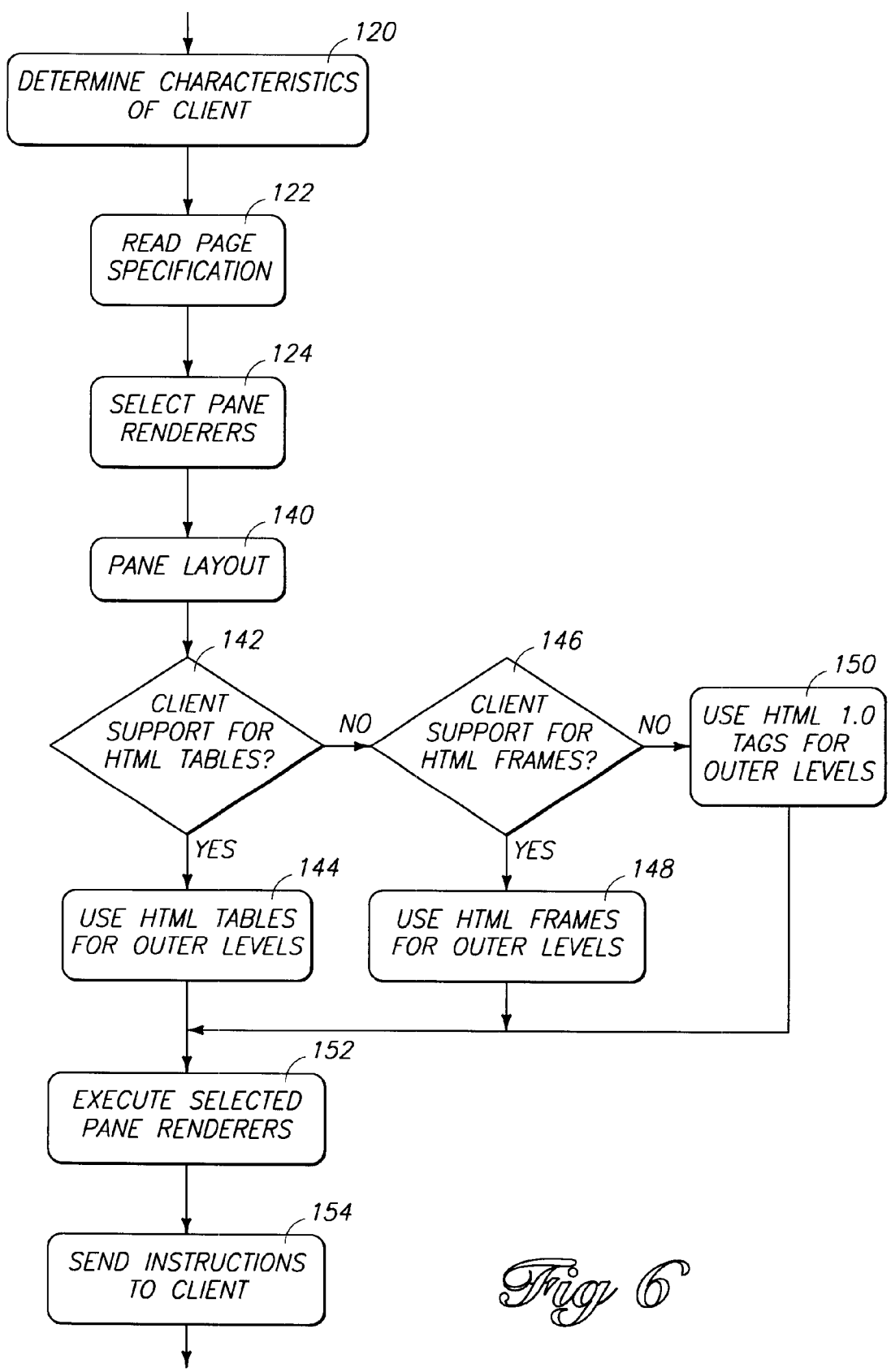
FIG. 6 is a flow chart showing steps performed by an HTML page renderer in accordance with the invention.

FIG. 6 shows steps performed by an exemplary page renderer configured to render information pages in conjunction with HTML client browsers. Note that the specific operation of a page renderer might vary significantly depending on the types of client devices and client viewers it supports. Also, the division of responsibilities between a page renderer and its pane renderers might vary depending on the situation. Specifically, the page renderer might in some cases generate significant portions of an instruction stream. Similarly, a particular pane renderer might have the ability to render a particular pane in more than one format, depending on the capabilities of the client.

A preparatory step 120 comprises determining applicable characteristics of the client that has requested an information page, including browser, display, and communications characteristics. This information might be passed to the page renderer from the dispatcher.

A step 122 comprises reading the page specification for the page that has been requested by the client. The page specification indicates or includes both page content and page design.

A step 124 comprises selecting one or more of the pane renderers to render the requested information page in conjunction with the client's browser. This step is performed to tailor the rendering of the information page for the client in response to the specific characteristics of the client. Specifically, this step comprises selecting a plurality of the renderers to render different portions or panes of the information page. A pane renderer is selected corresponding to each type of pane specified in the page specification.

The process of selecting a pane renderer is different for each pane type. Generally, the process involves executing a pane selection routine created specifically for the pane type to implement the pane selection rules associated with the pane types. The pane selection routine considers the characteristics of the client and compares them to rendering characteristics of each pane renderer.

Figures 7, 8:
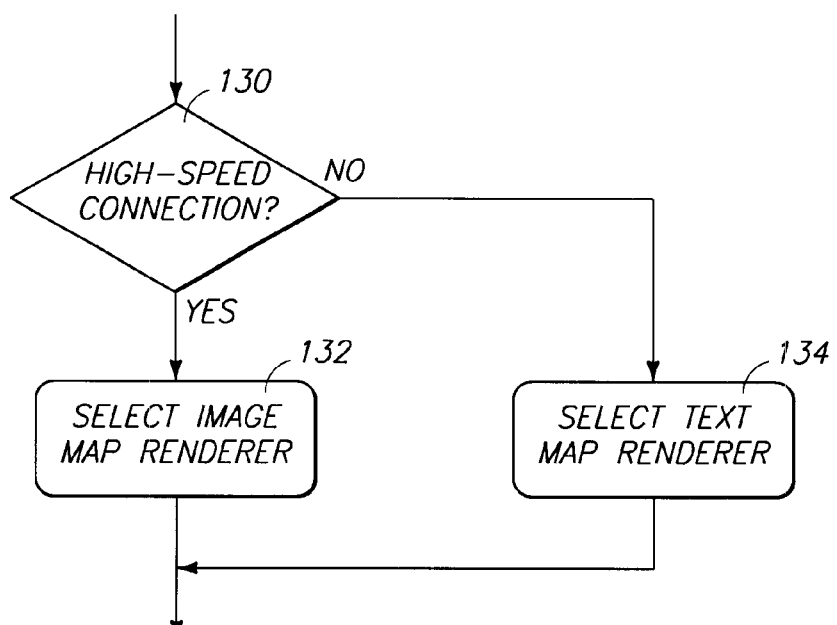
FIG. 7 is a flow chart showing steps performed by an exemplary pane selection routine.
FIG. 8 is a diagram showing part of a page specification for an exemplary information page.

FIG. 7 shows an example of a pane selection routine. In this case, a selection is made between two available pane renderers of the "map" pane type. One pane renderer generates images of maps, while the other renderer generates textual street instructions. The selection is made solely upon whether the client is connected to receive data at a high rate (such as a rate of at least 56 Kbits/second).

A first step 130 comprises determining whether a high-speed connection ($\geq$56 Kbits/second) exists to the client (this step might make use of information that is already known to the page renderer). If it does, a step 132 is executed of selecting the image map pane renderer. Otherwise, if such a high-speed connection does not exist, a step 134 is performed of selecting the text map pane renderer.

To aid in the selection process, every pane renderer has a set of registered attributes associated with it. Minimum pixel width and height are examples of registered pane renderer attributes, which can be used in conjunction with the nominal percentage of width and nominal percentage of height parameters specified in each pane description. For example, if a particular pane is to be 30% of the width of a page and 70% of the height, and if the client's screen size is 600 by 400 pixels, the pane selection routine will look for a pane renderer having minimum pixel width and height parameters of no more than 180 by 280 pixels, respectively.

Returning again to FIG. 6, step 140 comprises laying out the panes of the information page—establishing size and position characteristics of the information page panes in response to the designated nominal characteristics specified in the page specification of the information page. Specifically, the page renderer refers to the specified nominal positions of the various panes, and to the nominal sizes of the panes given in the pane specifications. The page renderer also refers to the characteristics of the client—specifically to the available display area, fonts, and resolution available to the browser—to determine whether the nominal sizes and positions are achievable and/or desirable.

In laying out the panes, the page renderer uses the specified nominal characteristics of the individual panes only as guidelines—the page renderer varies the tailored renderings of the information pages from their nominal sizes and positions to optimize the renderings for the clients that have requested the information pages. While the nominal sizes and positions are utilized if possible, they are varied as needed to achieve an efficient rendering in conjunction with the particular characteristics of each client.

Steps 142, 144, 146, 148, and 150 comprise emitting HTML instructions that implement the pane layout produced in step 140. These instructions set up outer HTML levels, within which the instructions for individual panes are eventually inserted.

At decision block 142, a decision is made regarding whether the requesting client device supports HTML tables. If it does, a step 144 is performed of generating outer HTML levels using HTML table tags. Otherwise, a decision 146 is made regarding whether the requesting client device supports HTML frames. If it does, a step 148 is performed of generating outer HTML levels using HTML frame tags. If the client device does not support either tables or frames, the outer levels of the HTML instruction stream are specified using standard HTML 1.0 tags as indicated by execution block 150 of FIG. 6.

Once the outer levels are in place, step 152 is performed of initiating or executing the selected pane renderers to emit pane instruction sequences corresponding to the individual panes of the information page. The pane instruction sequences are inserted at the appropriate places within the outer HTML structure.

Step 154 comprises sending the emitted instruction sequences to the client device, whereupon they are interpreted by the client viewer to display or render the tailored information page.

FIGS. 8–13 show an example of rendering a very simple information page using the methods described above. The information page has two panes: a title pane and a menu pane.

The page specification has a page ID equal to 100, a title pane having pane ID=1 a menu pane with pane ID=2. The pane order numbers of the panes indicate their positions relative to each other in a 3×2 grid as illustrated in FIG. 8.

The pane with ID=1 is located at the upper left. The panes having ID=2 and ID=3 are located sequentially below the pane with ID=1. The panes having ID=4, ID=5, and ID=6 are located from top to bottom to the right of the panes having ID=1, ID=2, and ID=3. In this case, the title pane, having pane ID=1, is located in the upper left position relative to the menu pane. The menu pane having pane ID=2, is located below the title pane. The other four possible pane positions of the 3×2 grid are shown in FIG. 8 as being empty. Keep in mind that FIG. 8 is illustrative only of the relative positions of the panes as specified by their IDs. FIG. 8 is not intended to represent the actual information page displayed by the example page specification.

FIG. 9 shows the pane specifications of the two panes. The pane having pane ID=1 is specified as being of the type "title," and the pane having pane ID=2 is specified as being of the type "menu." Both panes are to occupy 100% of the width of the page. The first pane (the title pane) is to occupy 25 percent of the height of the page, while the second pane (the menu pane) is to occupy the remaining 75 percent of the height of the page. The data for the title pane is located in a file named "SP_TITLE." The data for the menu pane is located in a file named "SP_MENU."

FIG. 10 shows the content of the file "SP_TITLE." It is organized as a table having only a single row or record, since there is to be only one title line in pane 1. The row indicates title text and the file name of an associated graphic image to be displayed along with the title text. This data is in accordance with the data schema for the "title" pane type.

FIG. 11 shows the content of the file "SP_MENU." Again, the file is organized as a table, this time having seven rows. Each row corresponds to an enumerated entry in the menu pane, according to the data schema for the "menu" pane type.

The data for the title and menu panes might be located in "files" as described above. Alternatively, such data might be drawn from a database table or query, or the data could be supplied by some other, independent, software component.

When a request for the information page having page ID=100 arrives at the server system, the dispatcher determines the client characteristics and selects a standard HTML page renderer that is compatible with the client's browser. The page renderer then calls the pane selection routines for the title and menu pane types, respectively, for selection of pane renderers for the title and menu panes.

In this hypothetical system, there are two registered title pane renderers: one that generates an image as output and another that generates text. In selecting which of these pane renderers to select, the pane selection routine for the title pane type is configured to look at the speed of the client's data connection. If it is relatively fast, the image renderer is selected. Otherwise, the text renderer is selected.

In this simplified case, there is only a single menu pane renderer, so the pane selection routine for the menu pane type selects the only available menu pane renderer.

Figures 12, 13:
FIG. 12 shows one rendering of the exemplary information page.
FIG. 13 shows another rendering of the exemplary information page.

FIG. 12 shows the results when a low-speed connection exists to the client. This page is the result of the following HTML code, generated by the two selected pane renderers:

```
<HTML>
<BODY>
<!--Generated by text title pane renderer-->
<HR>
<H1>Cityscape</H1>
<HR>
<!--Generated by default menu pane renderer-->
<H4>CITYSCAPE PRESENTS</H4>
<H4>ARTS & ENTERTAINMENT</H4>
<H4>SEATTLE RESTAURANTS</H4>
<H4>SPORTS</H4>
<H4>AROUND TOWN</H4>
<H4>THE BUSINESS PAGES</H4>
<H4>SEATTLE CITY MAP</H4>
</BODY>
</HTML>
```

FIG. 13 shows the results when a high-speed connection exists to the client. This page is the result of the following HLTML code, generated by the two selected pane renderers:

```
<HTML>
<BODY>
<!--Generated by graphics title pane renderer-->
<HR>
<IMG SRC="CITYLOGO.GIF">
<HR>
<!--Generated by default menu pane renderer-->
<H4>CITYSCAPE PRESENTS</H4>
<H4>ARTS & ENTERTAINMENT</H4>
<H4>SEATTLE RESTAURANTS</H4>
<H4>SPORTS</H4>
<H4>AROUND TOWN</H4>
<H4>THE BUSINESS PAGES</H4>
<H4>SEATTLE CITY MAP</H4>
</BODY>
</HTML>
```

Notice that the same essential information is presented in both cases, although non-essential information contained in the title pane differs. Notice also that the renderers are not strictly constrained to the size parameters in the pane specifications. In FIG. 12, for instance, the title pane is less than 25% of the height of the overall page.

The invention reduces the amount of work required to make WWW content available in different formats. Rather than having to author different HTML documents for different client devices, an author can create a single page specification for an information page. When the information page is requested, the server converts it to a format that is appropriate for the requesting client, in light any known characteristics of the client. This adds significantly to the value and usefulness of information transfer using the Internet and information exchange systems of the future.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An information server system, comprising:

a plurality of executable pane instruction generators;

a plurality of executable page instruction generators;

a server component that responds to a request for an information page by selecting and initiating one of the plurality of page instruction generators;

the initiated page instruction generator being configured to perform acts comprising:

reading a page specification for the requested information page, the page specification indicating page content and nominal page characteristics;

selecting one or more of the pane instruction generators to generate portions of the requested information page;

establishing size and position characteristics of said portions of the requested information page based on the nominal page characteristics indicated by the page specification;

generating HTML instructions that form an outer HTML structure for the portions of the requested information page;

initiating the selected pane instruction generators to generate inner HTML instructions corresponding to the portions of the requested information page; and returning the outer HTML structures and the inner HTML instructions in fulfillment of the request for the information page.

2. An information server system as recited in claim 1, wherein the page instruction generator selects said one or more pane instruction generators in accordance with characteristics of a client that has requested the information page.

3. An information server system as recited in claim 2, wherein said client characteristics comprise graphic display capabilities of the client.

4. An information server system as recited in claim 2, wherein said client characteristics comprise communications capabilities of the client.

5. An information server system as recited in claim 1, wherein the page specification designates nominal characteristics of the portions of the requested information page relative to each other within the information page, and wherein the page instruction generator is configured to use the designated nominal characteristics as guidelines when initiating the pane instruction generators to render the individual portions of the requested information page.

6. An information server system as recited in claim 1, wherein the page specification designates nominal relative sizes of the portions of the requested information page, and wherein the page instruction generator is configured to use the designated nominal sizes as guidelines when initiating the pane instruction generators to render the individual portions of the requested information page.

7. An information server system as recited in claim 1, wherein the page specification designates nominal relative sizes and positions of the portions of the requested information page, and wherein the page instruction generator is configured to use the designated nominal sizes and positions as guidelines when initiating the pane instruction generators to render the individual portions of the requested information page.

8. An information server system as recited in claim 1, wherein the pane instruction generators are implemented as software objects that encapsulate functionality and data.

9. An information server system as recited in claim 1, wherein each pane instruction generator is associated with one of a plurality of pane types.

10. An information server system as recited in claim 1, wherein each pane instruction generator is associated with one of a plurality of pane types, and wherein each pane type is associated with a data schema characterizing data to be rendered by the pane instruction generators.

11. In an information server system that accepts requests for information pages from different clients having different characteristics, one or more computer-readable storage media comprising a program that is executable to perform acts comprising:

determining the characteristics of a client that requests an information page;

finding a page specification for the requested information page, the page specification indicating page content and nominal page characteristics that are independent of client characteristics;

selecting and initiating one of a plurality of page instruction generators;

the initiated page instruction generator performing acts comprising:

selecting one or more of the pane instruction generators to generate portions of the requested information page;

establishing size and position characteristics of said portions of the requested information page based on the nominal page characteristics indicated by the page specification;

generating an outer structure for the portions of the requested information page; and initiating the selected pane instruction generators to generate inner instructions corresponding to the portions of the requested information page.

12. One or more computer-readable storage media as recited in claim 11, wherein the page instruction generator selects the one or more pane instruction generators to tailor the information page in accordance with characteristics of the client.

13. One or more computer-readable storage media as recited in claim 11, wherein the client characteristics comprise graphic display capabilities of the requesting client.

14. One or more computer-readable storage media as recited in claim 11, wherein said client characteristics comprise communications capabilities of the requesting client.

15. One or more computer-readable storage media as recited in claim 11, wherein the page specification designates nominal characteristics of the portions of the requested information page relative to each other within the information page, and wherein the page instruction generator is configured to use the designated nominal characteristics as guidelines when initiating the pane instruction generators to render the individual portions of the requested information page.

16. One or more computer-readable storage media as recited in claim 11, wherein the page specification designates nominal relative sizes of the portions of the requested information page, and wherein the page instruction generator is configured to use the designated nominal sizes as guidelines when initiating the pane instruction generators to render the individual portions of the requested information page.

17. One or more computer-readable storage media as recited in claim 11, wherein the page specification designates nominal relative sizes and positions of the portions of the requested information page, and wherein the page instruction generator is configured to use the designated nominal sizes and positions as guidelines when initiating the pane instruction generators to render the individual portions of the requested information page.

18. One or more computer-readable storage media as recited in claim 11, wherein the information page comprises a plurality of panes, each pane corresponding to a respective pane type.

19. One or more computer-readable storage media as recited in claim 11, the information page comprises a plurality of panes, each pane corresponding to a respective pane type, and wherein each pane type is associated with a data schema characterizing data to be generated.

20. One or more computer-readable storage media as recited in claim 11, wherein the page instruction generator selects said one or more pane instruction generators based on the characteristics of the client.

* * * * *

UNITED STATES PATENT AND TRADEMARK OFFICE
CERTIFICATE OF CORRECTION

PATENT NO.     : 6,434,578 B1
DATED          : August 13, 2002
INVENTOR(S)    : McCauley It is certified that error appears in the above-identified patent and that said Letters Patent is hereby corrected as shown below:

<u>Column 12,</u>
Line 14, replace "HLTML" with -- HTML --.

Signed and Sealed this

Third Day of December, 2002

JAMES E. ROGAN
*Director of the United States Patent and Trademark Office*